(12) United States Patent
Barron et al.

(10) Patent No.: US 11,914,722 B2
(45) Date of Patent: Feb. 27, 2024

(54) PERMISSION BASED MEDIA COMPOSITION

(71) Applicant: Snap Inc., Santa Monica, CA (US)

(72) Inventors: Christine Barron, Los Angeles, CA (US); Laurent Desserrey, Los Angeles, CA (US); Daniel Moreno, Los Angeles, CA (US); Celia Nicole Mourkogiannis, Los Angeles, CA (US); David Phillip Taitz, Los Angeles, CA (US); Christie Marie Heikkinen, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 124 days.

(21) Appl. No.: 17/133,337

(22) Filed: Dec. 23, 2020

(65) Prior Publication Data

US 2022/0198026 A1 Jun. 23, 2022

(51) Int. Cl.
*H04L 12/58* (2006.01)
*G06F 21/60* (2013.01)
*H04L 51/52* (2022.01)

(52) U.S. Cl.
CPC .............. *G06F 21/60* (2013.01); *H04L 51/52* (2022.05)

(58) Field of Classification Search
None
See application file for complete search history.

(56) References Cited

U.S. PATENT DOCUMENTS

| 9,721,239 | B1* | 8/2017 | Ho | H04L 67/306 |
| 10,019,136 | B1* | 7/2018 | Ozog | H04L 51/48 |
| 2017/0192651 | A1* | 7/2017 | Yang | G06F 3/04845 |
| 2019/0108292 | A1* | 4/2019 | Bowen | G06F 3/0482 |
| 2019/0130436 | A1* | 5/2019 | Ma | G06Q 30/0244 |
| 2019/0205015 | A1* | 7/2019 | Smith | G06T 11/60 |
| 2019/0206270 | A1* | 7/2019 | Agnew | G06Q 10/101 |

FOREIGN PATENT DOCUMENTS

WO WO-2022140132 A1 6/2022

OTHER PUBLICATIONS

"International Application Serial No. PCT/US2021/063601, International Search Report dated Mar. 23, 2022", 5 pgs.
"International Application Serial No. PCT/US2021/063601, Written Opinion dated Mar. 23, 2022", 5 pgs.
"International Application Serial No. PCT US2021 063601, International Preliminary Report on Patentability dated Jul. 6, 2023", 7 pgs.

* cited by examiner

*Primary Examiner* — Natisha D Cox

(74) *Attorney, Agent, or Firm* — Schwegman Lundberg & Woessner, P.A.

(57) ABSTRACT

A permission based media system to perform operations that include: presenting a first media object at a client device associated with a user account, the first media object including a reference that identifies the user account; receiving an input that selects the first media object from the client device; determining a permission of the user account based on the reference that identifies the user account; presenting a set of options based on the permission associated with the user account; receiving a selection of an option from among the set of options; and generating a second media object based on the first media object and the selection of the option, according to certain embodiments.

17 Claims, 10 Drawing Sheets

PERMISSION BASED MEDIA COMPOSITION

BACKGROUND

Social media are interactive computer-mediated technologies that facilitate the creation and sharing of information via virtual communities and networks. Some social media platforms enable users to generate and maintain collections of media content, wherein followers of those users may access and view those collections of media content at their respective devices, and even re-share media content from the collections of media content to their own population of followers. While such platforms provide a rich social experience, privacy is increasingly a concern that must be considered and addressed. For example, some users may not want certain content from a collection to be shared to a broader audience or may wish to retain a greater degree of control to the content that they create.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
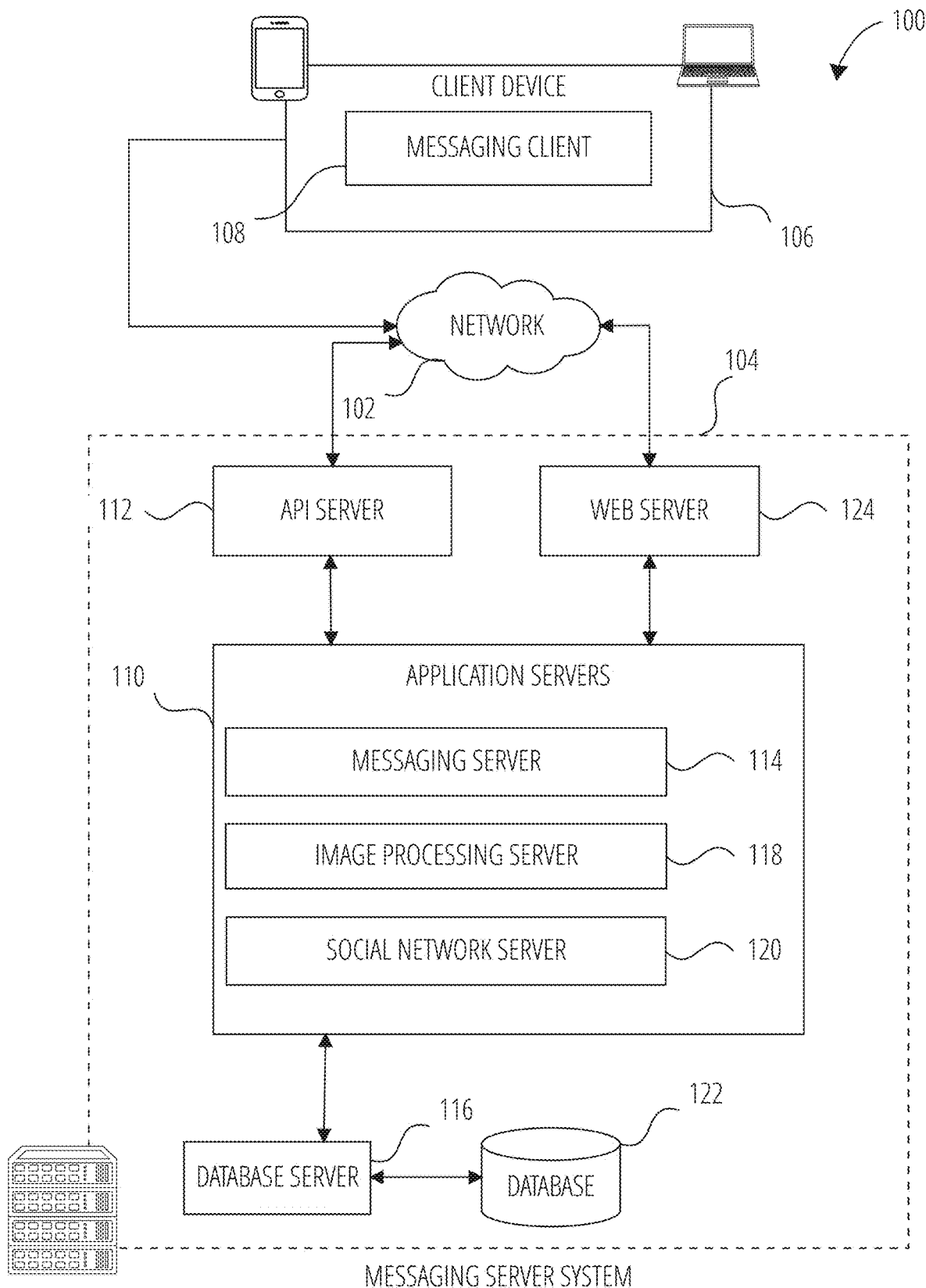
FIG. 1 is a diagrammatic representation of a networked environment in which the present disclosure may be deployed, in accordance with some examples.

As discussed above, social media platforms may provide features for receiving and displaying collections of media content generated or authored by users of the platforms. Users of these platforms may often wish to "re-share" such content within collections of their own. While there is a need to provide users with the ability to do so, further consideration must be given to respect privacy of users, and some level of creative ownership of content created by the users. For example, some users may prefer that their personal content is not accessible or viewable by friends-of-friends, or that only certain users within the social media platform may have permissions to create collaborative content based on media objects from their own collections. Accordingly, the disclosed system provides users with a means for providing access to media content based on a set of access policies and permissions that may be associated with a media object. For example, a permission based media system may be configured to perform operations that include: presenting a first media object at a client device associated with a user account, the first media object including a reference that identifies the user account; receiving an input that selects the first media object from the client device; determining a permission of the user account based on the reference that identifies the user account; presenting a set of options based on the permission associated with the user account; receiving a selection of an option from among the set of options; and generating a second media object based on the first media object and the selection of the option, according to certain embodiments.

In some embodiments, the permission based media system may maintain an access policy that may be applied to media objects generated by a user, wherein the access policy defines rules governing what actions may be performed by users that access or receive content generated by users of the social media platform. For example, an access policy may provide that only users that are tagged or "mentioned" in a media object may have permission to perform a set of actions on that media object, or that a destination of a media object, such as whether it is posted to a publicly accessible destination or shared privately, determines what actions may be performed upon the media object. The actions may for example include an option to re-share the media object to their own media collection, or to generate a collaborative media object based on the aforementioned media object, wherein the collaborative media object includes one or more attributes of the media object. As an illustrative example, a first user may generate a first media object, wherein the first media object comprises image data, and in some embodiments, a tag or mention that identifies a second users. The first user may thereby disseminate the first media object to one or more users by adding the first media object to a media collection that may be accessible by followers of the first users, or by distributing the first media object to one or more users directly (i.e., via a message, such as an ephemeral message). In some embodiments, the second user mentioned by the tag of the first media object may automatically be notified or presented with the first media object based on the inclusion of the tag or mention that identifies the second user.

Upon receiving the first media object, a second user may provide an input that selects the second media object. Responsive to receiving the input, the permission based media system may cause display of a plurality of options that include actions which the second user has permission to perform upon the first media object. These options may for example include an option to allocate the first media object to a media collection associated with the second user, distribute/send the first media object to one or more recipients, or to generate a second media object (i.e., a collaborative media object), based on the first media object. For example, the second media object may comprise the image data of the first media object, and media content selected by the second user, such as an image or media filter.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
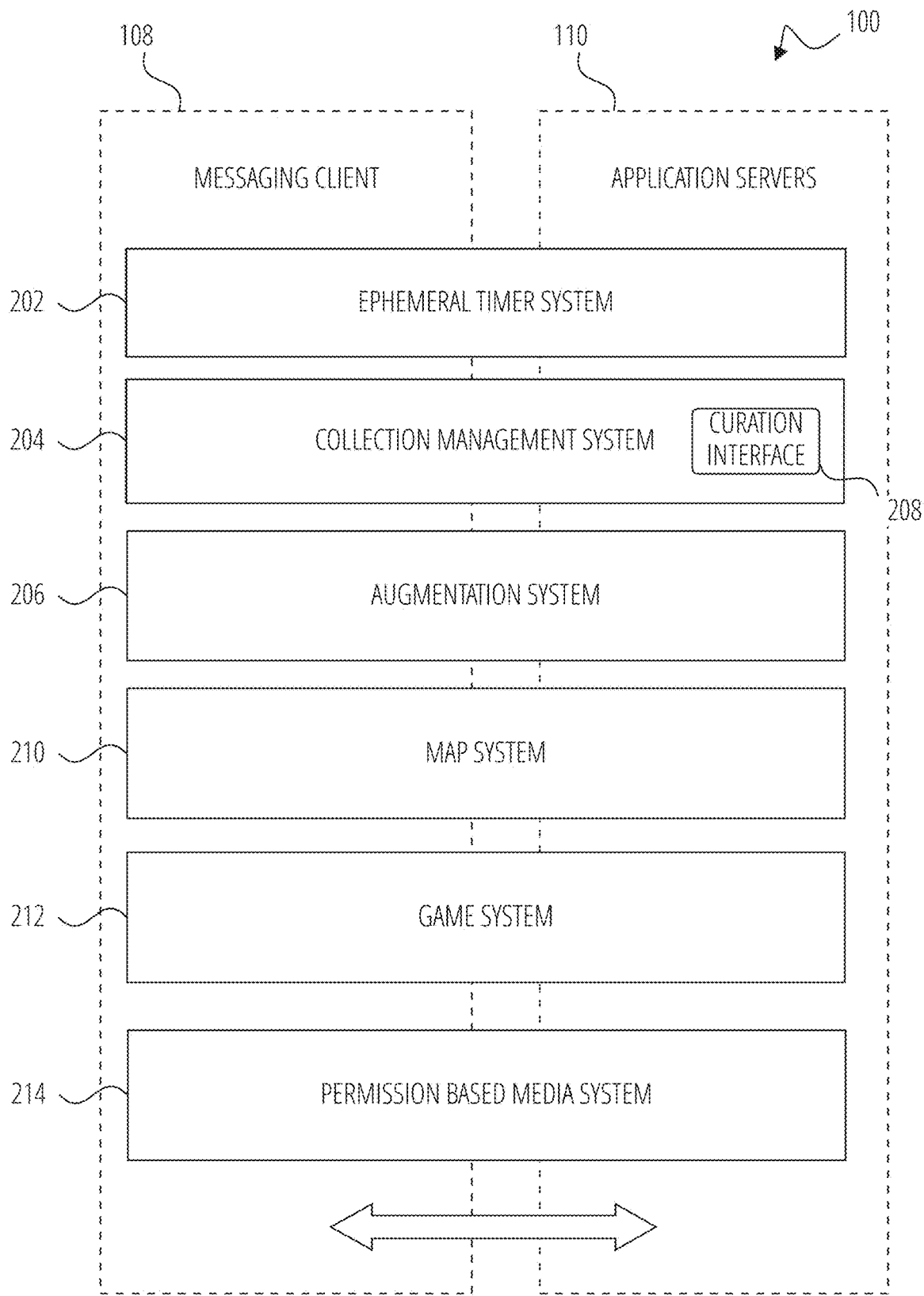
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a permission based media system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The permission based media system 214 provides functions related to governing access to media objects based on an access policy and permissions, according to certain example embodiments.

Figure 3:
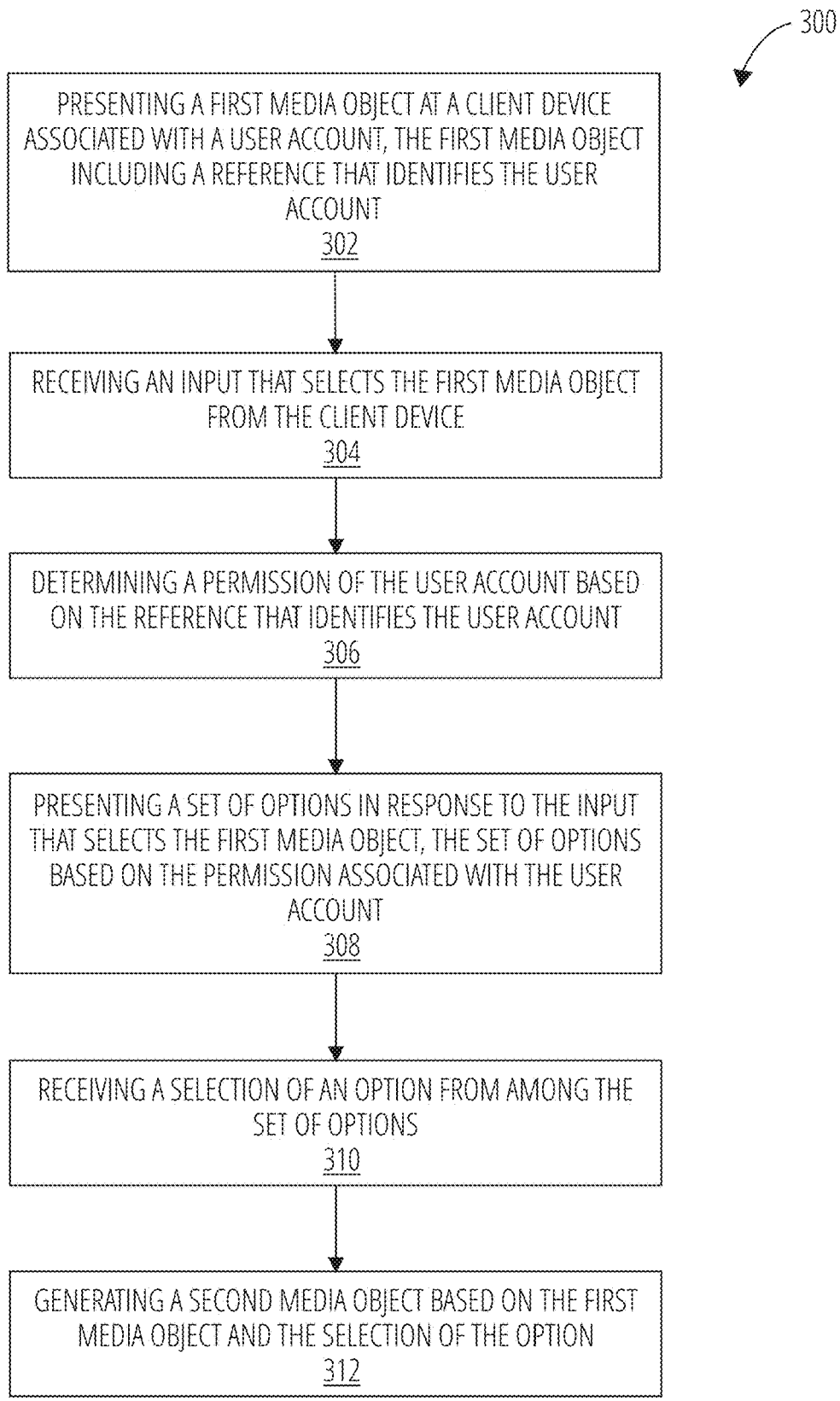
FIG. 3 is a flowchart depicting a method 300 for providing access to media content based on permissions, in accordance with one embodiment.

FIG. 3 is a flowchart illustrating operations of a permission based media system 214 in performing a method 300 for providing access to media content based on permissions, in accordance with one embodiment. Operations of the method 300 may be performed by one or more subsystems of the messaging system 100 described above with respect to FIG. 2, such as the permission based media system 214. As shown in FIG. 3, the method 300 includes one or more operations, 302, 304, 306, 308, 310, and 312.

At operation 302, the permission based media system 214 presents a first media object at a client device 106, wherein the client device 106 is associated with a user account. In certain embodiments, the first media object comprises image data, and a reference to a user identifier associated with the user account of the client device 106. For example, the reference may include a "mention," or "tag," which comprises a display of the user identifier associated with the user account.

At operation 304, the permission based media system 214 received an input that selects the first media object from the client device 106. In some embodiments, the input may include a tactile input that comprises a predefined gesture, such as a swipe up, swipe down, double tap, press and hold, or other similar gesture. Responsive to receiving the input that selects the first media object, at operation 306, the permission based media system 214 determines a permission associated with the user account.

In some embodiments, the permission based media system 214 may reference a set of access policies that define actions which may be performed by users upon the first media objects based on attributes of the users, or associated permissions of the users. For example, in certain embodiments, users which are mentioned or referenced in a media object may be provided with a set of permissions that include the ability to generate collaborative media based on the media object, or to add a media object to an associated media collection. Likewise, in some embodiments, attributes of the media object itself may determine the corresponding access policies. For example, a destination that the media object was originally shared to (i.e., publicly shared vs. privately shared) may determine the corresponding access policies of the media object.

Accordingly, at operation 306, the permission based media system 214 may determine a set of permissions associated with the user account, based on attributes of the first media object such as the reference to the user account within the first media object. For example, based on the access policy associated with the first media object, users associated by user identifiers referenced in the first media object may receive permission to perform a set of actions upon the first media object.

At operation 308, the permission based media system 214 presents a set of options at the client device 106, in response to the input that selects the first media object, and based on the permission associated with the user account. For example, the set of options may include an option to generate a collaborative media object based on the first media object, and an options to include the first media object within a media collection associated with the user account.

At operation 310 the permission based media system 214 receives a selection of an option from among the set of options. For example, a user of the client device 106 may provide an input to present the first media object among a collection of media objects associated with the user account, or to generate a collaborative media object based on the first media object.

Responsive to the input that selects the option from among the set of options, at operation 312, the permission based media system 214 generates a second media object based on the first media object and the selection of the option. For example, the second media object may comprise elements of the first media object, such as image data of the first media object, and additional elements which may be selected or specified by a user associated with the user account. For example, the second media object may comprise a display of image data associated with the first media object, along with an attribution that identifies the source of the first media object, and one or more graphical elements selected and placed at positions upon the image data of the first media object.

Figure 4:
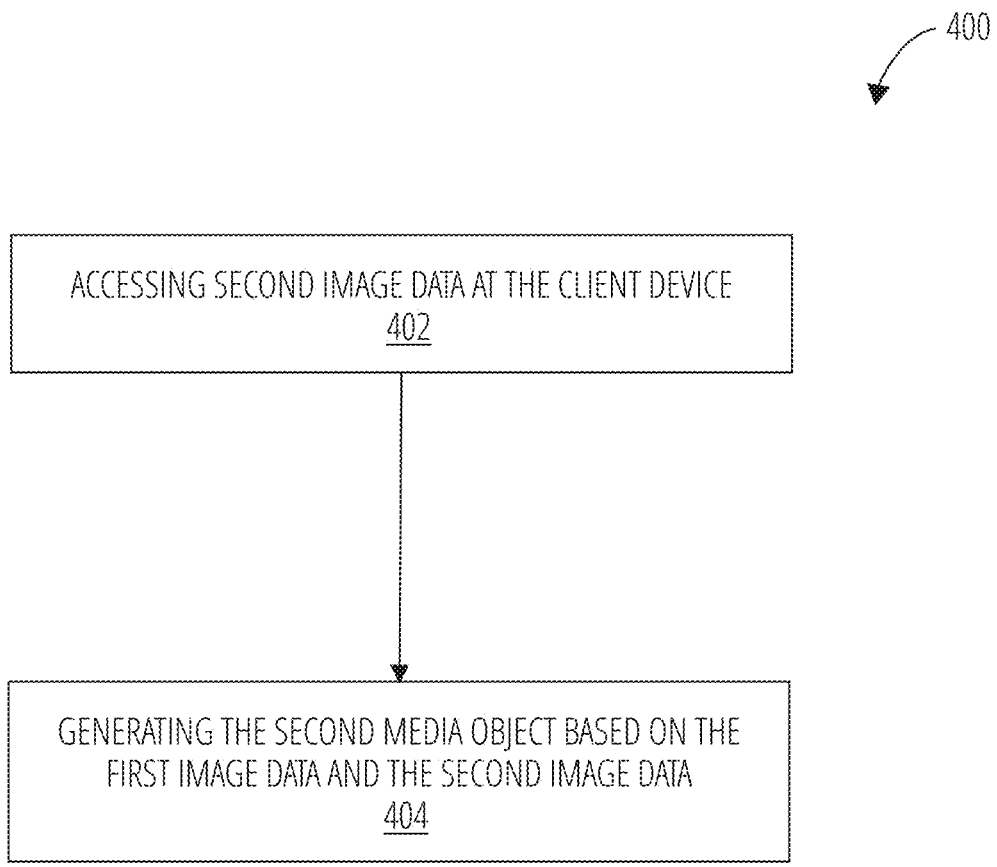
FIG. 4 is a flowchart depicting a method 400 for generating a media object based on permissions, in accordance with one embodiment.

FIG. 4 is a flowchart depicting operations of a permission based media system 214 in performing a method 400 for generating a media object based on permissions, in accordance with one embodiment. Operations of the method 400 may be performed by one or more subsystems of the messaging system 100 described above with respect to FIG. 2, such as the permission based media system 214. As shown in FIG. 4, the method 400 includes one or more operations 402 and 404 which may be performed as a subroutine of one or more operations of the method 300, including for example operation 312, wherein a second media object is generated.

At operation 402, the permission based media system 214 accesses image data at the client device 106. For example, the first media object described in the method 300 may comprise first image data, and the image data accessed by the permission based media system 214 may comprise second image data. Accordingly, responsive to determining a permission associated with a user account, and receiving an input selecting an option from among a set of options, the permission based media system 214 may present a media composition interface at the client device 106. A user of the client device 106 may thereby provide inputs to modify, alter, add, or augment elements of the first media object through the composition interface.

For example, a user of the client device 106 may provide an input to select the second image data from a catalogue of image data associated with the user account. Responsive to receiving the input that selects the second image data, at operation 404, the permission based media system 214 generates the second media object, wherein the second media object comprises the first image data of the first media object, and the second image data selected by the user. An illustrative example of a second media object is provided in FIG. 5.

Figure 5:
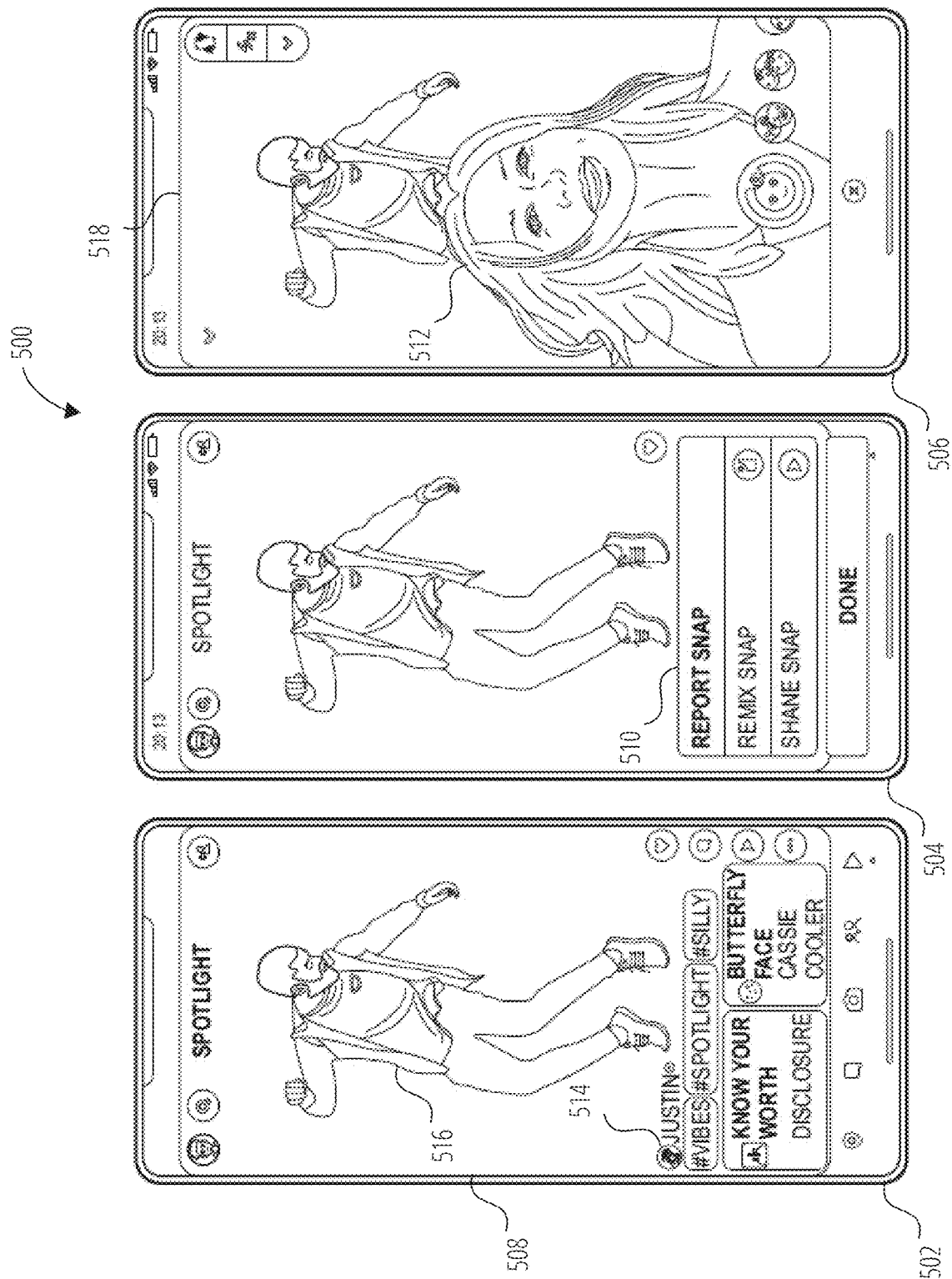
FIG. 5 is an interface flow diagram 500 depicting graphical user interfaces (GUI) presented by a permission based media system, in accordance with one embodiment.

FIG. 5 is an interface flow diagram 500 depicting GUIs presented by a permission based media system 214, in accordance with one embodiment, such as those described in the method 300 of FIG. 3, and the method 400 of FIG. 4.

As seen in the interface flow diagram 500, the permission based media system 214 may present a first media object 508 within the GUI 502 at a client device 106. For example, as described in operation 302 of the method 300, the permission based media system 214 presents the first media object 508 at a client device 106, wherein the client device 106 is associated with a user account. As seen in the GUI 502, the first media object comprises image data 516, and a reference to a user identifier 514, wherein the reference to the user identifier 514 may be associated with the user account of the client device 106.

As discussed in operation 304, the permission based media system 214 receives an input that selects the first media object 508. For example, the input may include a tactile input that selects one or more elements depicted within the first media object 508. Responsive to receiving the input that selects the first media object 508, as described in operation 306, and as depicted in the GUI 504, the permission based media system 214 determines a permission associated with the user account, and causes display of the set of options 510.

In some embodiments, and as provided in the method 300, the set of options 510 may be selected based on a relationship of the user associated with the client device 106 and a source of the first media object 508. For example, according to an access policy associated with the first media object 508, users that are mentioned or tagged in a media object may be granted with permission to perform certain predefined actions upon a media object (i.e., edit or re-share the media object), or similarly, users that are direct connections with a source of a media object within a social network may be granted with permissions to perform certain predefined actions upon the media object.

Responsive to receiving an input that selects an option from among the set of options 510, the permission based media system 214 may generate the second media object 518, wherein the second media object 518 comprises the image data 516 of the first media object 508, and second image data 512, wherein the second image data 512 may be based on a selection received from a user of the client device 106.

Accordingly, a user of the client device 106 may allocate the second media object 518 to a media collection or gallery associated with the user account of the user, or distribute the second media object 518 to one or more recipients.

Figure 6:
FIG. 6 is an interface flow diagram 600 diagram depicting GUIs presented by a permission based media system, in accordance with one embodiment.

FIG. 6 is an interface flow diagram 600 depicting GUIs presented by a permission based media system 214, in accordance with one embodiment.

As seen in the GUI 602, the permission based media system 214 may present a media object 608, wherein the media object 608 is associated with a media collection 610. For example, the media collection 610 may be referenced by or associated with a hashtag (i.e., #DOGS).

In some embodiments, the media collection 610 may be associated with an access policy, wherein the access policy defines actions that may be performed by users upon media objects among the collection of media objects 610, such as the media object 608. Accordingly, responsive to receiving an input that selects the media object 608, the permission based media system 214 may present a set of options within the GUI 602, wherein the set of options is based on the access policy associated with the media collection 610.

In some embodiments, the permission based media system 214 may also retain a collection of collaborative media objects that are generated based on media objects from among the collection of media objects 610. For example, the permission based media system 214 may present the menu element 606, wherein selection of the menu element 606 may cause display of a media collection of collaborative content generated based on media associated with the media collection 610. For example, responsive to receiving a selection of the menu element 606, the permission based media system 214 may present the GUI 604, wherein the GUI comprises a collection of collaborative media objects that are generated based on media objects from among the collection of media objects 610.

Figure 7:
FIG. 7 is an interface flow diagram 700 depicting GUIs presented by a permission based media system, in accordance with one embodiment.

FIG. 7 an interface flow diagram 700 depicting GUIs presented by a permission based media system 214, in accordance with one embodiment. in accordance with one embodiment.

According to certain embodiments, as seen in in the GUI 702, the permission based media system 214 may cause display of a notification 706 at a client device 106, responsive to receiving a media object that includes a tag or mention that reference a user account associated with the client device 106.

In some embodiments, responsive to receiving an input that selects the notification 706, the permission based media system 214 may present a set of options, such as the set of options 510. A user may thereby provide an input to select an option from among the set of options in order to generate a collaborative media object, as depicted in the GUI 704.

Machine Architecture

Figure 8:
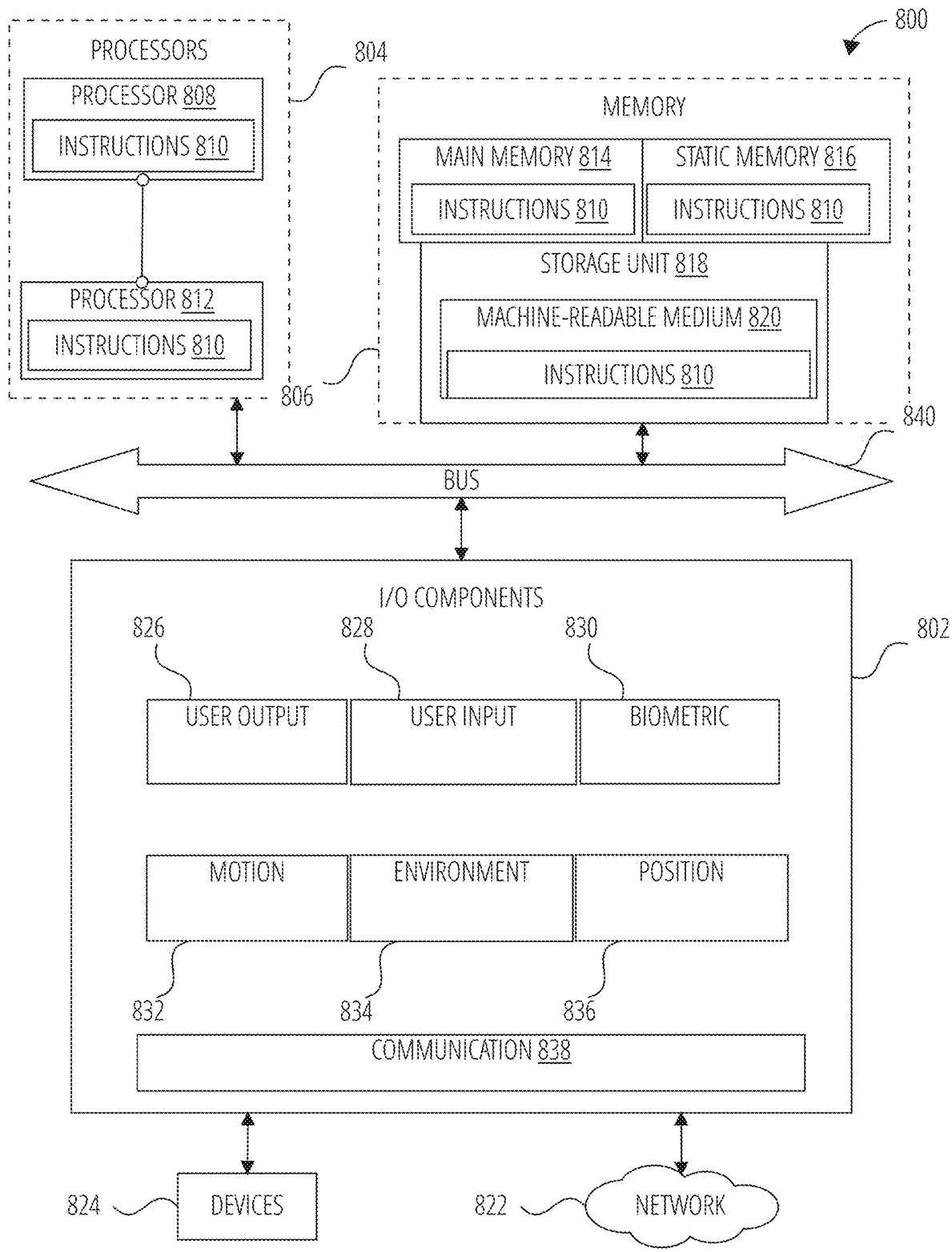
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 106 or any one of a number of server devices forming part of the messaging server system 104. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 638, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
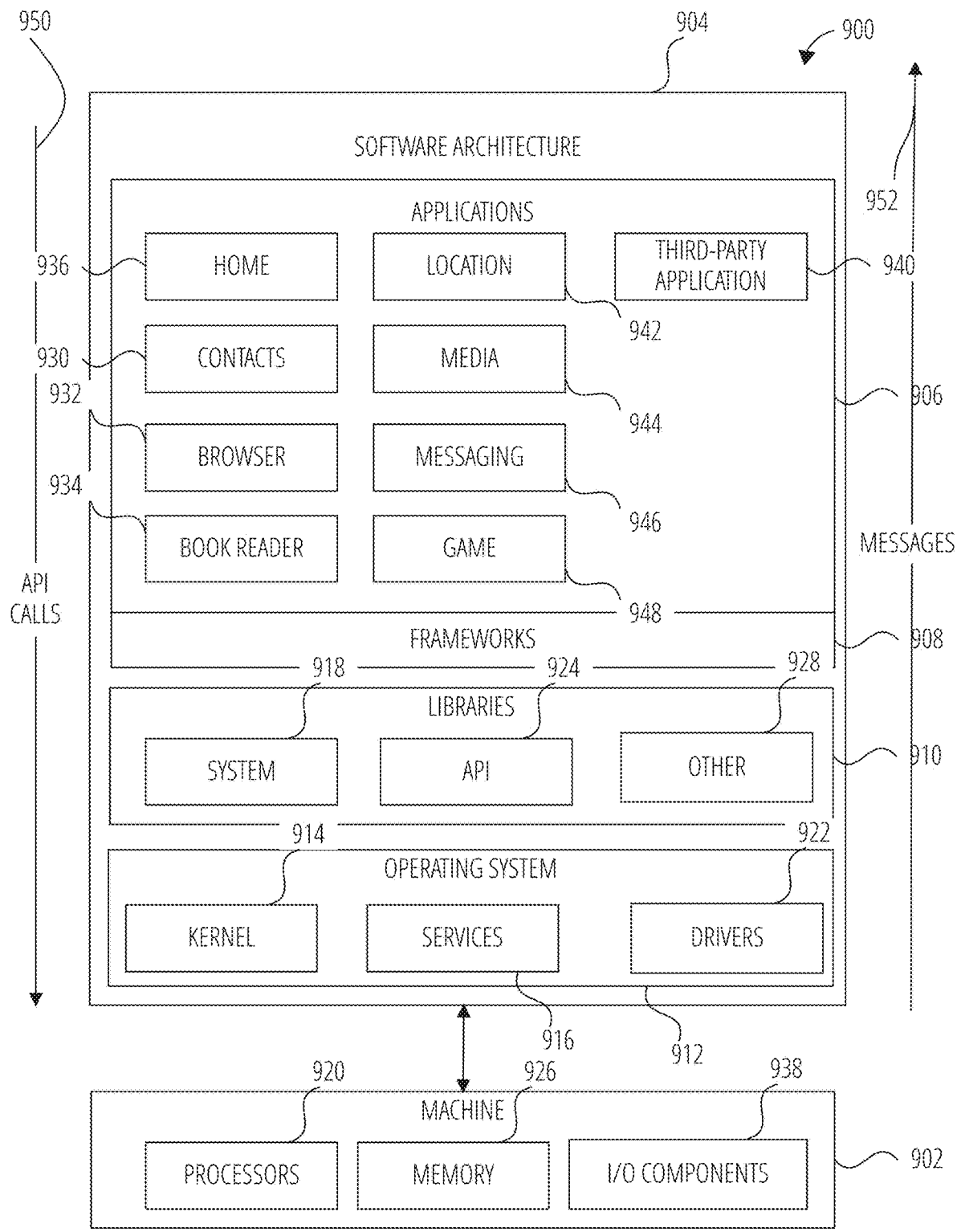
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Processing Components

Figure 10:
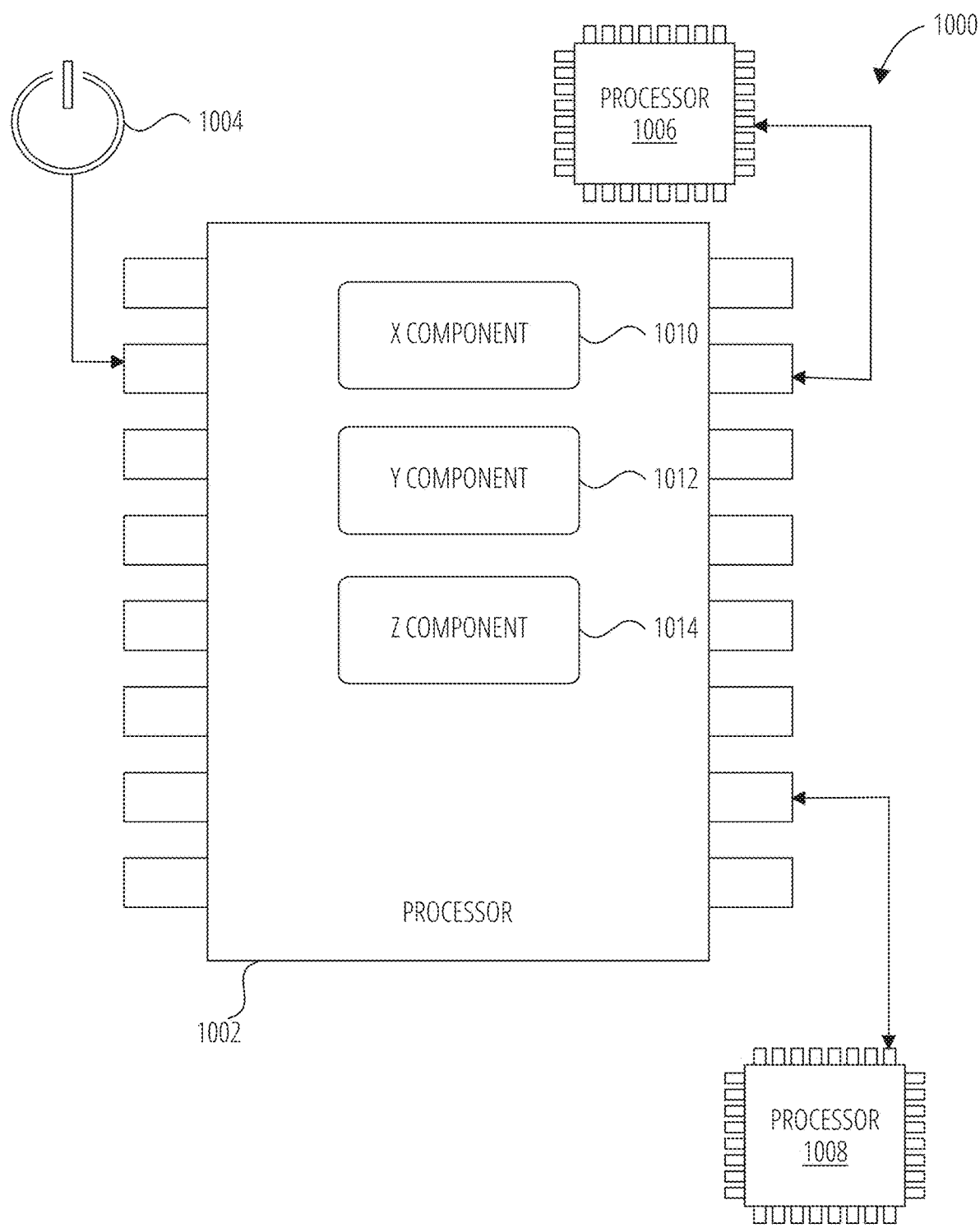
FIG. 10 is a diagrammatic representation of a processing environment, in accordance with some examples.

Turning now to FIG. 10, there is shown a diagrammatic representation of a processing environment 1000, which includes a processor 1002, a processor 1006, and a processor 1008 (e.g., a GPU, CPU or combination thereof).

The processor 1002 is shown to be coupled to a power source 1004, and to include (either permanently configured or temporarily instantiated) modules, namely an X component 1010, a Y component 1012, and a Z component 1014. The X component 1010 operationally maintains an access policy to define actions that may be performed on media objects, the Y component 1012 operationally determines a permission associated with a user account, and the Z component 1014 operationally generates media objects based on inputs received from client devices. As illustrated, the processor 1002 is communicatively coupled to both the processor 1006 and the processor 1008.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    presenting a first media object at a client device associated with a user account, the first media object comprising an attribution that identifies a source of the first media object, and a display of one or more user identifiers that correspond with one or more user accounts;
    accessing an access policy that defines a permission to access the first media object, the access policy providing the permission to access the first media object to the one or more user accounts based on the first media object including the display of the one or more user identifiers;
    receiving an input that selects the first media object from the client device;
    granting the permission to access the first media object to the user account based on the display of the one or more user identifiers that include a user identifier associated with the user account;
    presenting a set of options based on the permission associated with the user account;
    receiving a selection of an option from among the set of options; and
    generating a second media object that comprises the attribution that identifies the source of the first media object, a presentation of the first media object, and one or more graphical elements.

2. The method of claim 1, wherein the first media object comprises first image data, and the generating the second media object includes:
    accessing second image data at the client device; and
    generating the second media object based on the first image data and the second image data.

3. The method of claim 2, wherein the accessing the second image data at the client device includes:
    accessing a media repository associated with the user account, the media repository including the second image data; and
    receiving an input that selects the second image data from among the media repository.

4. The method of claim 1, wherein the method further comprises:
    allocating the second media object to a media collection associated with the user account.

5. The method of claim 1, wherein the presenting the first media object at the client device includes:
    receiving a message that includes the first media object at the client device.

6. The method of claim 1, wherein the presenting the first media object at the client device includes:
    receiving a request to access a media collection from the client device, the media collection including the first media object.

7. A system comprising:
    a memory; and
    at least one hardware processor coupled to the memory and comprising instructions that causes the system to perform operations comprising:
    presenting a first media object at a client device associated with a user account, the first media object comprising an attribution that identifies a source of the first media object, and a display of one or more user identifiers that correspond with one or more user accounts;
    accessing an access policy that defines a permission to access the first media object, the access policy providing the permission to access the first media object to the one or more user accounts based on the first media object including the display of the one or more user identifiers;
    receiving an input that selects the first media object from the client device;
    granting the permission to access the first media object to the user account based on the display of the one or more user identifiers that include a user identifier associated with the user account;
    presenting a set of options based on the permission associated with the user account;
    receiving a selection of an option from among the set of options; and
    generating a second media object that comprises the attribution that identifies the source of the first media object, a presentation of the first media object, and one or more graphical elements.

8. The system of claim 7, wherein the first media object comprises first image data, and the generating the second media object includes:
    accessing second image data at the client device; and
    generating the second media object based on the first image data and the second image data.

9. The system of claim 8, wherein the accessing the second image data at the client device includes:

accessing a media repository associated with the user account, the media repository including the second image data; and receiving an input that selects the second image data from among the media repository.

10. The system of claim 7, wherein the operations further comprise:

allocating the second media object to a media collection associated with the user account.

11. The system of claim 7, wherein the presenting the first media object at the client device includes:

receiving a message that includes the first media object at the client device.

12. The system of claim 7, wherein the presenting the first media object at the client device includes:

receiving a request to access a media collection from the client device, the media collection including the first media object.

13. A non-transitory machine-readable storage medium comprising instructions that, when executed by one or more processors of a machine, cause the machine to perform operations comprising:

presenting a first media object at a client device associated with a user account, the first media object comprising an attribution that identifies a source of the first media object, and a display of one or more user identifiers that correspond with one or more user accounts;

accessing an access policy that defines a permission to access the first media object, the access policy providing the permission to access the first media object to the one or more user accounts based on the first media object including the display of the one or more user identifiers;

receiving an input that selects the first media object from the client device;

granting the permission to access the first media object to the user account based on the display of the one or more user identifiers that include a user identifier associated with the user account;

presenting a set of options based on the permission associated with the user account;

receiving a selection of an option from among the set of options; and generating a second media object that comprises the attribution that identifies the source of the first media object, a presentation of the first media object, and one or more graphical elements.

14. The non-transitory machine-readable storage medium of claim 13, wherein the first media object comprises first image data, and the generating the second media object includes:

accessing second image data at the client device; and generating the second media object based on the first image data and the second image data.

15. The non-transitory machine-readable storage medium of claim 14, wherein the accessing the second image data at the client device includes:

accessing a media repository associated with the user account, the media repository including the second image data; and receiving an input that selects the second image data from among the media repository.

16. The non-transitory machine-readable storage medium of claim 13, wherein the operations further comprise:

allocating the second media object to a media collection associated with the user account.

17. The non-transitory machine-readable storage medium of claim 13, wherein the presenting the first media object at the client device includes:

receiving a message that includes the first media object at the client device.

* * * * *